June 13, 1950 M. R. HUBBARD 2,511,586

ULTRA HIGH FREQUENCY TUNER ARRANGEMENT

Filed Oct. 1, 1946

INVENTOR.
MERLE R. HUBBARD
BY John J. Rogan
ATTORNEY

Patented June 13, 1950

2,511,586

UNITED STATES PATENT OFFICE 2,511,586

ULTRA HIGH FREQUENCY TUNER ARRANGEMENT

Merle R. Hubbard, Cedar Rapids, Iowa, assignor to Collins Radio Company, Cedar Rapids, Iowa, a corporation of Iowa Application October 1, 1946, Serial No. 700,462

9 Claims. (Cl. 178—44)

This invention relates to ultra high-frequency systems and more especially to tuning or resonating arrangements for use in such systems.

A principal object of the invention is to provide an improved tuning arrangement for ultra high-frequency systems employing an adjustable condenser and an adjustable transmission line inductance.

Another object is to provide a more efficient and compact ultra high-frequency tuning device incorporating an adjustable condenser, and a transmission line having the linear elements thereof eccentrically rotatable with relation to each other to adjust the effective inductance thereof.

Another object relates to a novel adjustable ultra high-frequency transmission line section which is adjustable simultaneously as a unit with a cooperating capacitor to control the tuning of associated ultra high-frequency equipment.

A feature of the invention relates to a unitary device comprising an adjustable capacitor with rotor and stator plates, one set of plates being connected to a rigid transmission line conductor, and the other set of plates being connected to a cooperating rigid transmission line conductor, with a common adjusting member for the rotor plates and for one of the transmission line conductors so as simultaneously to change the capacity of the condenser and the inductance of the line.

Another feature relates to a unitary ultra high-frequency tuning device comprising a variable condenser, the rotor plates of which are connected as a unit to a rigid transmission line conductor and the stator plates of which are likewise connected to a cooperating transmission line conductor. The first-mentioned transmission line conductor is eccentrically rotatable with respect to the other transmission line conductor by the operating member for the condenser rotor plates, and a special commutator and brush arrangement is provided for completing the inductive loop formed by said transmission line conductors throughout the entire range of movement of the condenser rotor plates.

A still further feature relates to the novel organization, arrangement and relative location and interconnection of parts which cooperate to provide an improved ultra high-frequency tuner unit.

Other features and advantages not particularly enumerated will be apparent after a consideration of the following detailed descriptions and the appended claims.

Figure 3:
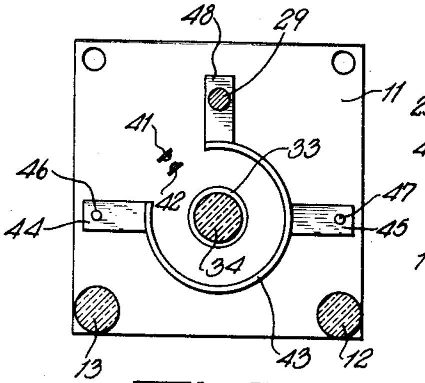
Fig. 3 is a sectional view of Fig. 1, taken along the line 3—3 thereof, and viewed in the direction of the arrows.
Figure 4:
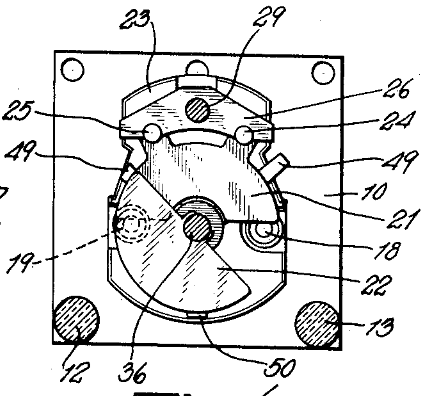
Fig. 4 is a sectional view of Fig. 1, taken along the line 4—4 thereof, and viewed in the direction of the arrows.

Referring to the drawing, the device comprises two end plates 10, 11, of suitable high frequency insulation material which plates are held in rigid spaced parallel relation by a pair of insulator tie rods 12, 13, and respective fastening screws 14—17. Anchored to plate 10 by screws 18, 19, is an adjustable electrostatic condenser 20 of any well-known construction, comprising a set of stator plates 21 and a cooperating interleaved set of rotor plates 22. The stator plates are fastened to a ceramic block 23 through the intermediary of metal rods 24, 25, which are rigidly fastened to the block 23. Rods 24, 25, are joined by a metal strip 26, and a ceramic tubular spacer rod 27 extends between strip 26 and block 23 to which it is fastened by screw 28. Passing through plate 26 and threaded into the opposite end of insulator 27 is a rigid metal rod 29, which at its opposite end, passes through plate 11 and is fastened thereto by nut 30. As will be pointed out hereinbelow, rod 29 forms one ultra high-frequency transmission line conductor and is preferably externally silvered. Preferably also the condenser 20 is mounted in spaced relation to plate 10 by intervening washers 31, 32. The rod 29 where it passes through plate 20 is brazed or soldered thereto. Mounted in the plate 11 is a suitable bearing sleeve 33 through which passes a cylindrical insulator shaft 34 which is fastened at one end, as by a transverse pin 35, to the end of the metal post 36 which carries the rotor plates 22. Fastened to the insulator shaft 34 by a suitable pin 37 is an insulator arm 38. Welded, soldered or otherwise rigidly fastened to the rotor post 36 is an L-shaped metal member 39, having a linear portion 40, which extends parallel to the rod 29. Suitably fastened to the end of the linear portion 40 is a brush or wiper comprising springs 41, 42, which are adapted to engage respectively the outer and inner surfaces of a metal sleeve 43 (Fig. 3) attached to plate 11 by integral lugs 44, 45, and respective fastening screws 46, 47. Sleeve 43 has an additional integral lug 48, through which the rod 29 passes and is in electrical contact therewith.

Figure 1:
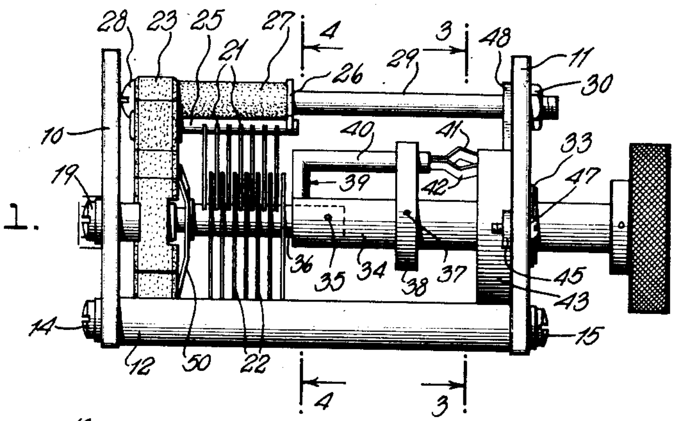
Fig. 1 is a side elevational view of a tuner unit according to the invention.
Figure 2:
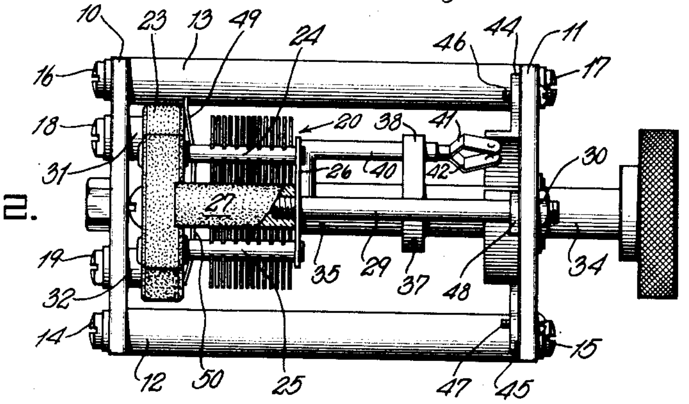
Fig. 2 is a top-plan view of Fig. 1.
Figure 5:
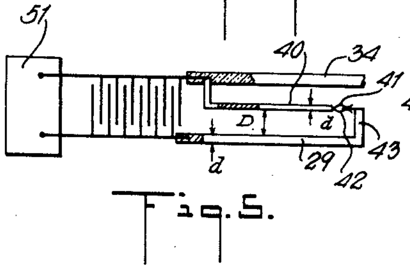
Fig. 5 is a schematic representation of the electrical circuit of the unit.
Figure 6:
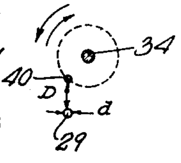
Fig. 6 is another schematic view explanatory of the invention.

When using the device to tune an ultra high-frequency circuit or load 51 (Fig. 5), the circuit or load 51 is connected at one terminal to the metal strip 26, and at the other terminal to the lug 49 on spring 50, which is in wiping contact with the rotor post 36. From the construction above described, it will be seen that the elements 29 and 40 form the parallel conductors of a high frequency transmission line which at its remote end (right-hand end as seen in Figs. 1 and 2), is short-circuited by the wiping contact between sleeve 43 and brushes 41, 42. I have found that by rotating the member 40 relative to the member 29, the inductance of this transmission line can be varied at the same time that the condenser 20 is also varied. The equivalent schematic electrical diagram of the device is illustrated in Figs. 5 and 6, wherein the spacing between the members 29 and 40 at any given setting of shaft 34, is D, the diameter of the members 29 and 40 each being respectively $d$. Assuming that the characteristic impedance of the transmission line formed by the conductors 29 and 40, is $Z_0$, and assuming that $\theta$ is the length of the transmission line in electrical degrees, then $$Z_s=Z_0\frac{\frac{Z_L}{Z_0}\cos\theta+j\sin\theta}{\cos\theta+j\frac{Z_L}{Z_0}\sin\theta} \qquad (1)$$

where $Z_0$ is the characteristic impedance of the transmission line

Z is the load impedance $\theta$ is the length of the transmission line in electrical degrees.

when $Z_L=0$ $$Z_s=jZ_0\frac{\sin\theta}{\cos\theta}=jZ_0\tan\theta$$

substituting for $Z_0$ $$Z_0=276\log_{10}\frac{2D}{d}$$

where

D is the spacing of the wires $d$ is the diameter of the wires $$Z_s=276\log_{10}\frac{2D}{d}\tan\theta$$

let $K=276\tan\theta$ $\tan\theta$ is positive between 0 and 90°, which makes $Z_s$ an inductance $$Z_s=j(\log 2D-\log_{10}d)K$$

$d$ is constant so $\log_{10}d$ is K'

$$Z_s=j(\log_{10}2D-K')K$$

This shows that for a parallel wire transmission line between 0 and 90° the inductance varies with the wire spacing, D.

While one particular embodiment has been described herein, it will be understood that various changes and modifications may be made therein without departing from the spirit and scope of the invention.

What is claimed is:

1. An adjustable inductance comprising a first rigid transmission line conductor, means to support said conductor at opposite ends, a rotatable shaft mounted parallel to said first conductor, a second rigid transmission line conductor, means to support said second conductor on said shaft for rotation therewith so as to vary the parallel spacing between said conductors, and a brush and commutator arrangement connecting the adjacent ends of said conductors during the said rotation.

2. An adjustable inductance comprising a first transmission line conductor, means to support said conductor rigidly at opposite ends, a rotatable shaft of insulation material mounted in spaced parallel relation with said first conductor, a second transmission line conductor supported on said shaft parallel to the first conductor, and a brush and commutator arrangement connecting the adjacent ends of said conductors during the rotation of said shaft.

3. An adjustable inductance comprising a first transmission line conductor, means to support said conductor rigidly at opposite ends, a rotatable shaft of insulation material mounted parallel to said first conductor, a second L-shaped rigid transmission line conductor attached to said shaft for rotation as a unit therewith, one leg of said L-shaped conductor being parallel to said first conductor, one end of the first conductor and the adjacent end of the said leg of said L-shaped conductor being electrically connected through a commutator and brush arrangement.

4. In combination, an electrostatic condenser having stator and rotor elements, a first transmission line conductor, a second transmission line conductor, the adjacent ends of said conductors being connected respectively to the stator and rotor elements of said condenser, and means to rotate the second transmission line conductor eccentrically and bodily around the first conductor to vary the effective inductance associated with said condenser without changing the respective lengths of said conductors.

5. An adjustable inductance, comprising a fixed transmission line conductor, a movable transmission line conductor said conductors forming part of an inductive loop whose inductance is a function of the spacing between the said conductors, a rotary shaft offset from said fixed conductor and carrying said movable conductor, and means to rotate said shaft to vary the parallel spacing between said conductors while simultaneously varying the angular relation of the common plane of said conductors.

6. An adjustable inductance according to claim 5 in which said rotary shaft is mounted parallel to said fixed conductor to rotate said movable conductor in a cylindrical path offset from the said fixed conductor.

7. In combination, an electrostatic condenser having stator and rotor elements, a shaft for said rotor elements, a pair of transmission line conductors, means fixedly mounting one conductor with respect to the stator elements of said condenser, means to mount the other conductor in offset relation on said shaft for rotation as a unit with said rotor elements, and means to rotate said shaft for simultaneously varying the parallel spacing between said conductors and thereby varying the effective inductance formed by said conductors.

8. The combination according to claim 7 in which said fixedly mounted conductor is electrically connected at one end to said stator elements, and said movable conductor is electrically connected at the corresponding end to said rotor elements, and commutator means interconnecting the opposite respective ends of both said conductors to complete an inductive circuit therebetween during rotation of said shaft.

9. A resonating unit for ultra high-frequency systems, comprising a pair of end plates of insulating material, an electrostatic condenser having a stator and a rotor supported from one end plate, a circular commutator strip supported on the other end plate concentric with said condenser rotor, a movable brush in wiping engagement with said strip, a first transmission line conductor extending between said condenser stator and said other end plate and electrically connected to said commutator strip, a second transmission line conductor electrically connected at one end to the condenser rotor and at the opposite end to said brush, a shaft for said rotor passing through said other end plate, and means to support said second transmission line conductor on said shaft for rotary movement as a unit concentrically with said shaft to vary the parallel spacing between said conductors and thereby to vary the resonant frequency of the unit.

MERLE R. HUBBARD.

REFERENCES CITED

The following references are of record in the file of this patent:

FOREIGN PATENTS

| Number | Country | Date |
|---|---|---|
| 550,774 | Great Britain | Jan. 25, 1943 |

OTHER REFERENCES

Gable and Read, "Wide Range Tank Circuits for V. H. F. and U. H. F."—Q. S. T. for April 1945, pages 48 and 49. Copy in 250-40Z, Division 10.